Sept. 15, 1964     B. B. MATHIAS     3,148,969
FORMING NARROW NECK GLASS CONTAINERS
Filed March 16, 1961

INVENTOR.
BENNY B. MATHIAS
BY
J. R. Nelson
and D. T. Innis
ATTORNEYS

United States Patent Office 3,148,969
Patented Sept. 15, 1964

3,148,969
FORMING NARROW NECK GLASS CONTAINERS
Benny B. Mathias, Toledo, Ohio, assignor to Owens-Illinois Glass Company, a corporation of Ohio
Filed Mar. 16, 1961, Ser. No. 96,125
4 Claims. (Cl. 65—356)

This invention relates to the forming of narrow neck glass containers and particularly to hollow plungers which are used in forming such containers by a press and blow process.

In the forming of glass containers by a press and blow process, a gob of glass is pressed by the interaction of a plunger with a mold to form a hollow parison that is subsequently blown to form the complete container. Where the containers that are being formed are narrow in neck, that is, the internal diameter of the neck is one and one-half inch or less, the plunger takes the form of a long narrow tapered construction. Since the plunger tends to become heated, it is necessary to cool it. Conventional methods of cooling by use of water are unsatisfactory. Similarly, considerable difficulty has been encountered in the utilization of air. If the plunger is insufficiently cooled, the plunger tends to stick to the glass and, if the plunger is cooled too much, it tends to crizzle the glass.

It is therefore an object of this invention to provide a novel plunger construction which will result in efficient cooling of the plunger by the use of fluid such as air.

Basically, the invention comprises utilizing a thin walled cooling tube of tapered construction within the hollow plunger to define an annular zone of substantially uniform thickness and providing radial openings in the tube so that when fluid, such as air, is introduced axially into the interior of the tube it passes outwardly against the interior of the hollow plunger to cool the plunger and is thereafter removed axially from the annular zone. The preferred arrangement is wherein the cross section of the annular zone at any longitudinal section is substantially equal to the sum of the areas of the openings in the tube from that section toward the tip of the plunger.

Figures 1, 2:
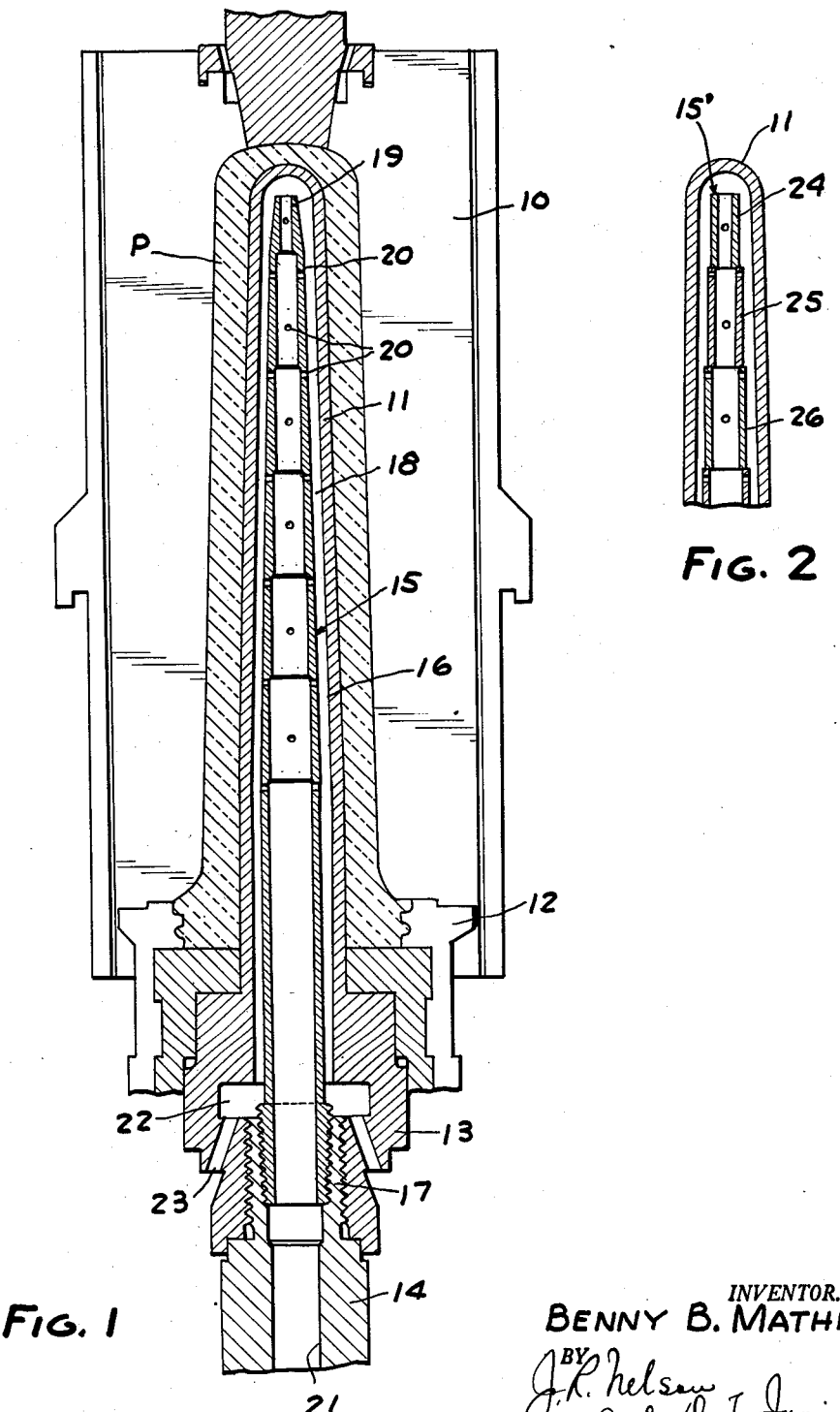
FIG. 1 is a vertical section through a glass forming apparatus utilizing the hollow plunger embodying the invention.
FIG. 2 is a fragmentary view similar to FIG. 1 of a modified form of plunger.

Referring to FIG. 1, a conventional partible parison mold 10 is adapted to receive a charge of glass in a conventional manner which charge is thereafter pressed by upward movement of plunger 11 to form the hollow parison P. As shown in FIG. 1, a partible neck ring 12 is used in connection with the parison mold 10 and serves to define the neck of the article as well as a means for supporting the parison after the parison mold 10 is open. This arrangement is part of a press and blow apparatus.

According to the invention, a hollow plunger 11 is fixed to a support 13 so that when the support 13 is moved upwardly by actuation of shaft 4 of a piston motor, not shown, the plunger 11 is moved into position to press the glass and form the parison.

Plunger 11 is of thin walled construction and made of a suitable plunger material such as is well known in the art. In accordance with the invention, a tapered cooling tube 15 is supported in the interior of the hollow plunger 11 in spaced relationship to the inner wall 16 thereof. This is achieved by threading of the end of the cooling tube 15 in a sleeve 17 that is, in turn, threaded into the support 13.

The cooling tube 15 is shaped in such a manner as to define a generally uniformly thick annular zone 18 with the inner surface 16 of the plunger 11. Cooling tube 15 includes an axial opening 19 in the end thereof which is adapted to direct cooling fluid against the tip of the plunger 11. In addition, cooling tube 15 is formed with a plurality of radially extending openings or holes 20 at longitudinally spaced points which direct the cooling fluid outwardly against the inner wall 16 of plunger 11. Cooling fluid is supplied through axial opening 21 in piston rod 14 to the interior of the cooling tube 15. The cooling fluid passes through openings 19, 20 and is removed from the annular zone 18 through an annular chamber 22 formed in the support 13 and communicating with the annular zone 18. Generally axially extending passages 23 in the support 13 provide communication to the exterior so that the fluid can pass outwardly to the atmosphere.

I have determined that the transverse cross sectional area of the annular zone 18 at any section should preferably be substantially equal to the sum of the areas of the openings 20 and 19 from that section to the tip of the plunger. In addition, the outer diameter of the tube 15 at any section should be substantially equal to 0.71 times the internal diameter of the plunger at that section.

By providing the arrangement heretofore described with the specific relationship of the annular area to the size of the openings, an efficient cooling of the plunger 11 is achieved without excessive cooling thereof and without hot spots.

The term "tapered" as utilized in connection with the cooling tube 15 is intended to cover an arrangement wherein the cooling tube is made by utilizing a plurality of tubular sections of different cross sections such as shown in FIG. 2 wherein the cooling tube 15' is made up of a plurality of cylindrical sections 24, 25, 26 that are joined together to give a generally tapered construction.

The term "narrow neck containers" as used herein is intended to cover containers wherein the internal diameter of the neck is one and one-half inch or less.

I claim:

1. In an apparatus for forming hollow glass containers having a mouth with an internal diameter not greater than one and one-half inches, the combination comprising a hollow plunger adapted to cooperate with a mold for pressing of a gob of glass into a hollow parison, the upper portion of said plunger defining the mouth of the container and having an external diameter not greater than one and one-half inches, said plunger having a substantially thin uniformly thick wall and being tapered toward the tip thereof, a cooling tube positioned within said hollow plunger and spaced from the inner surface of the wall thereof to define an annular space of substantially uniform thickness throughout between the tube and the wall of the plunger, means defining a fluid inlet to the interior of said tube, and means defining a fluid outlet from said annular space, said cooling tube having a plurality of spaced holes therein providing communication between the interior of the tube and the annular space, the cross sectional area of said annular space at any longitudinally spaced section between adjacent holes being substantially equal to the sum of the areas of the holes in the tube between that section of said annular space and the tip of said tube.

2. In an apparatus for forming hollow glass containers having a mouth with an internal diameter not greater than one and one-half inches, the combination comprising a hollow plunger adapted to cooperate with a mold for pressing of a gob of glass into a hollow parison, the upper portion of said plunger defining the mouth of the container and having an external diameter not greater than one and one-half inches, said plunger having a substantially thin uniformly thick wall and being tapered toward the tip thereof, a cooling tube positioned within said hollow plunger and spaced from the inner surface of the wall thereof to define an annular space of substantially uniform thickness throughout, means defining a fluid inlet to the interior of said tube, and means defining a fluid outlet from said annular space, said cooling tube having an axial opening therein adjacent the tip of the plunger, a plurality of spaced radial holes therein providing communication between the interior of the tube and the annular space, the cross sectional area of said annular space at any longitudinally spaced section between adjacent holes being substantially equal to the sum of the areas of the opening and the holes in the tube between that section of said annular space and the tip of said tube.

3. In an apparatus for forming hollow glass containers having a mouth with an internal diameter not greater than one and one-half inches, the combination comprising a hollow plunger adapted to cooperate with a mold for pressing of a gob of glass into a hollow parison, the upper portion of said plunger defining the mouth of the container and having an external diameter not greater than one and one-half inches, said plunger having a substantially thin uniformly thick wall and being tapered toward the tip thereof, a tapered cooling tube positioned within said hollow plunger and spaced from the inner surface of the wall thereof to define an annular space of substantially uniform thickness throughout, means defining a fluid inlet to the interior of said tube, and means defining a fluid outlet from said annular space, said cooling tube having a plurality of spaced holes therein providing communication between the interior of the tube and the annular space, the cross sectional area of said annular space at any longitudinally spaced section between adjacent holes being substantially equal to the sum of the areas of the holes in the tube between that section of said annular space and the tip of said tube.

4. In an apparatus for forming hollow glass containers having a mouth with an internal diameter not greater than one and one-half inches, the combination comprising a hollow plunger adapted to cooperate with a mold for pressing of a gob of glass into a hollow parison, the upper portion of said plunger defining the mouth of the container and having an external diameter not greater than one and one-half inches, said plunger having a substantially thin uniformly thick wall and being tapered toward the tip thereof, a cooling tube positioned within said hollow plunger and spaced from the inner surface of the wall thereof, said tube comprising a plurality of generally cylindrical portions of progressively changing diameter toward the tip of the plunger thereby defining an annular space of substantially uniform thickness throughout, means defining a fluid inlet to the interior of said tube, and means defining a fluid outlet from said annular space, said cooling tube having a plurality of spaced holes therein providing communication between the interior of the tube and the annular space, the cross sectional area of said annular space at any longitudinally spaced section being adjacent holes being substantially equal to the sum of the areas of the holes in the tube between that section of said annular space and the tip of said tube.

References Cited in the file of this patent

UNITED STATES PATENTS

| 1,057,198 | Winder | Mar. 25, 1913 |
| 2,688,823 | Weber | Sept. 14, 1954 |

FOREIGN PATENTS

| 1,034,823 | Germany | July 17, 1956 |